May 13, 1924.                                                 1,493,521
C. E. CORSON ET AL
METHOD FOR DRILLING AND APPLYING BRAKE BAND LININGS
Original Filed March 25, 1922
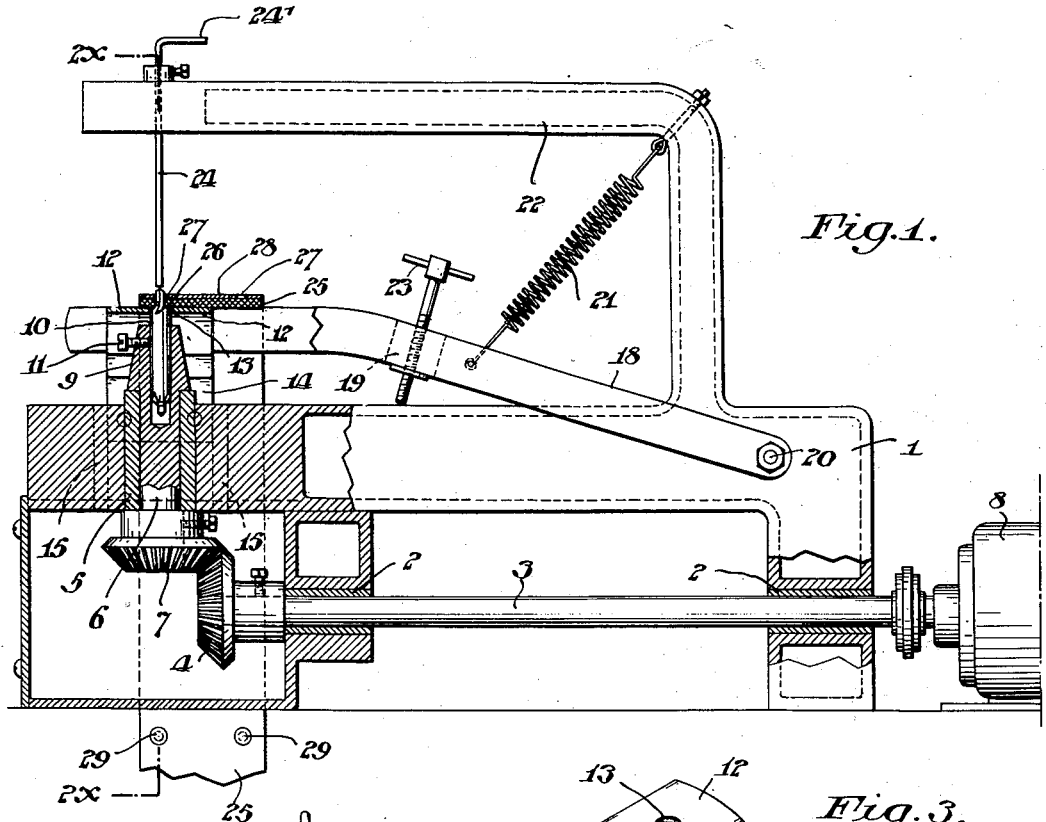
Fig. 1.
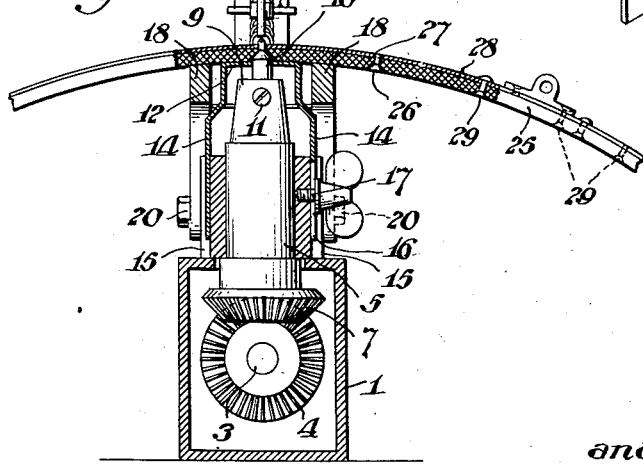
Fig. 2.
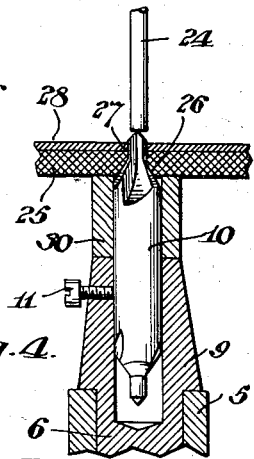
Fig. 3.
Fig. 4.
Inventors:
Chalon E. Corson,
and William A. Wright,
By
Attorney.

Patented May 13, 1924.

1,493,521

UNITED STATES PATENT OFFICE.

CHALON E. CORSON AND WILLIAM A. WRIGHT, OF BRIDGEPORT, CONNECTICUT.

METHOD FOR DRILLING AND APPLYING BRAKE-BAND LININGS.

Original application filed March 25, 1922, Serial No. 545,567. Divided and this application filed March 6, 1924. Serial No. 697,428.

*To all whom it may concern:*

Be it known that we, CHALON E. CORSON and WILLIAM A. WRIGHT, citizens of the United States, and residents of Bridgeport, in the county of Fairfield and State of Connecticut, have jointly invented an Improved Method for Drilling and Applying Brake-Band Linings, of which the following is a specification.

This invention is designed to facilitate the application of linings to brake bands and the present application is a division of our application Serial No. 546,567, filed March 25, 1922. It is characterized, in the preferred construction and operation, by the use of the brake band as a templet and anvil for a drill having a registering device for positioning the band and lining so that the tool, adapted for boring a countersunk hole in the lining, will form such hole in registration with the hole in the band, the band and lining being riveted together without separating them between the drilling and riveting operation, with the result that the work is done rapidly and correctly.

In the preferred practice of our method, an end of the lining is engaged against an end of a curved apertured brake band and pressed against a support. While pressed against the support by the curved band, the lining is drilled and countersunk from its face opposite the band to form a rivet-hole in registration with a band aperture, and the ends of the band and lining are then riveted together. The opposite end of the lining is similarly engaged with the corresponding end of the curved brake band, pressed thereby against a support, drilled and countersunk from its face opposite the band while pressed thereby against the support, and the lining and band ends riveted together. The intermediate portions of the lining are then sequentially engaged against the band and pressed against the support, and while so pressed the lining is drilled and countersunk from its face opposite the band. The intermediate band and lining sections are then riveted together. By fastening both ends of the lining to the brake band and thereafter pressing the lining against the support by means of the band, the lining is subjected to tensile and compressive forces while being drilled and countersunk from its face opposite the band to form rivet-holes in registration with band apertures.

By our method it is practicable to rapidly and accurately apply linings to brake bands, with avoidance of the difficulties heretofore experienced in correctly positioning each of the many apertures in registration with the band apertures by a separate adjustment of the lining in making each aperture with a loose end of the band constantly in the way, or where the unlined surface of the band is of irregular shape due to clevises or protuberances thereon. Our method insures the provision in the lining of rivet holes drilled upon an accurate radius and of such cross section as to permit free insertion of the rivet and provide for secure engagement of the rivet head when upset, with avoidance of the difficulties incident to applying to a curved surface a lining which has been drilled while flat.

Our improved method is preferably practiced by the use of mechanism having a work support forming a rest for a lining on a band, a revoluble tool for perforating and countersinking the lining, one of such members being suitably movable toward and from the other, and a guide visibly indicating the position of the tool when the latter is concealed by a lining and band on the support.

In the accompanying drawings, Fig. 1 is a broken side elevation of drilling mechanism adapted for the practice of our improved method; Fig. 2 is a sectional view taken on the line $2^x$—$2^x$ of Fig. 1; Fig. 3 is a perspective view of a detached detail of the mechanism, and Fig. 4 is a sectional view taken axially through the drill chuck of a modified construction.

The mechanism illustrated comprises a frame 1 provided with the horizontal bearings 2, in which is journalled the shaft 3 having the beveled gear 4 fixed thereon, and the vertical bearing 5, in which is journalled the spindle 6 having the beveled gear 7 fixed thereon in engagement with the gear 4; the shaft 3 being driven by the motor 8 and driving the spindle 6 through the gears 4 and 7.

The spindle 6 is provided with the tool holder 9 in the socket of which is held the drill bit 10 by the set screw 11, the bit 10 passing through the bearing or work support 12 provided with the aperture 13 therefor. The bearing 12 has the bifurcations or legs 14 which are movable to effect adjustment in the vertical ways 15 of the frame, one of the legs having therein the vertical slot 16 through which passes a screw 17 into the frame to hold the bearing at the desired elevation.

Levers 18, fixed together by a cross piece 19, have the aligned fulcrums 20 carried by the frame and upon which they are adapted to oscillate as an integral construction having bifurcations on opposite sides of the bearing 12. A coiled spring 21 connects this lever mechanism with the elbow arm 22 carried by the frame, whereby the mechanism is elevated, and a screw 23, movable through the member 19, engages the frame to limit the downward movement of the lever mechanism so that the tops of its bifurcations on either side of the bearing 12 shall be approximately level with the top thereof.

A guide rod and position finder 24 is movable freely through the horizontal member of the arm 22 in line with the bit 10 and into contact therewith, the rod having the laterally projecting part 24' at its top for preventing it from falling through the arm or limiting its downward movement and serving as a handle.

The work to be done involves the drilling of the fabric brake band lining 25, so that it shall have counter sunk holes 26 therein registering with the holes 27 in the brake band 28, and the attachment of the lining to the band by the rivets 29 having their heads disposed with the counter sinks.

In carrying out the operation, the lining 25 is placed in the desired final relation to the band 28 and, thus arranged, the lining is placed on the bifurcations of the lever mechanism 18 and over the bearing 12 so that the liner or guide rod 24 will enter the hole 27 in registration with which a hole 26 is to be drilled in the lining. The band and lining with the supporting mechanism 18 now being moved downward, the tool or bit 10 suitably constructed therefor bores a hole 26 through the lining in registration with the hole 27 in the band, the point of the tool passing through the band and elevating the rod 24 in countersinking the hole in the lining, which countersinking is limited by the engagement of the lining with the bearing 12 and the relation of the bit 10 to such bearing.

End holes having been formed in the lining in registration with end holes in the band, rivets are set therein, and with these rivets as an anchorage the lining is stretched in the desired final relation to the band, the further holes required are drilled therein as described and rivets are passed through such holes and the registering holes in the band, where they are upset to secure the parts together.

Owing to the fact that the lining is bent to conform with the curved band, the fibres in the outer surface of the lining are stretched and the fibres in the inner surface of the lining are compressed during the operation of drilling the holes so that the apertures formed in the lining by the drill are on proper radial lines and are of uniform cross section and consequently the rivets are easily passed through such apertures.

As illustrated in Fig. 4, the adjustable bearing 12, for limiting the downward movement of the lining and the depth of the countersinks formed therein by the drill bit, may be omitted and a bushing 30 placed on the bit so as to rest on the tool holder 9 and project upwardly so as to limit the downward movement of the lining on the bit, bushings of different heights being used as may be required by the thicknesses of the linings and the depths of the countersinks required.

Having described our invention, we claim:

1. The method of securing linings to curved apertured brake bands which comprises engaging an end of the lining against the band and pressing the lining against a support, drilling and countersinking the lining from its face opposite the band while pressed against the support by the band, riveting the drilled end of said lining and band together; engaging the other end of the lining against the band and pressing the lining against a support, drilling and countersinking the lining from its face opposite the band while pressed against the support by the band, riveting such drilled end of the lining and band together; and engaging intermediate portions of said lining against said band by pressing the lining against a support, drilling and countersinking the lining from its face opposite the band while curved and pressed against the support by the band, and riveting the intermediate drilled sections of said lining and band together.

2. The method of securing a lining to a curved apertured brake band, which comprises fastening both ends of the lining to the brake band, pressing intermediate sections of the lining against a support, drilling and countersinking said lining from its face opposite the band in registration with apertures of said band while curved and pressed against said support and band, and riveting the band and lining together through the drilled holes.

3. The method of securing linings to apertured brake bands, which comprises engaging the lining to a curved surface of the band and subjecting the lining to tensile and compressive forces and drilling and countersinking the lining in registration with band apertures while subjected to such forces.

In witness whereof we have hereunto set our names this 28th day of February, 1924.

CHALON E. CORSON.
WILLIAM A. WRIGHT.